United States Patent
Schneidewind et al.

(10) Patent No.: US 8,094,925 B2
(45) Date of Patent: Jan. 10, 2012

(54) METHOD FOR INCREASING THE ACCURACY OF THE POSITIONING OF A FIRST OBJECT RELATIVE TO A SECOND OBJECT

(75) Inventors: Stefan Schneidewind, Reichenberg (DE); Claus Dietrich, Sacka (DE); Jorg Kiesewetter, Dresden (DE); Michael Teich, Friedewald (DE); Thomas Tharigen, Dresden (DE)

(73) Assignee: Cascade Microtech, Inc., Beaverton, OR (US)

( * ) Notice: Subject to any disclaimer, the term of this patent is extended or adjusted under 35 U.S.C. 154(b) by 0 days.

(21) Appl. No.: 12/619,327

(22) Filed: Nov. 16, 2009

(65) Prior Publication Data

US 2010/0111403 A1 May 6, 2010

Related U.S. Application Data

(63) Continuation of application No. 12/170,848, filed on Jul. 10, 2008, now abandoned, which is a continuation of application No. 10/824,884, filed on Apr. 15, 2004, now abandoned.

(30) Foreign Application Priority Data

Apr. 16, 2003 (DE) .................. 103 17 778

(51) Int. Cl.
*G06K 9/00* (2006.01)
*G06K 9/32* (2006.01)

(52) U.S. Cl. ..................................... 382/151

(58) Field of Classification Search .......... 382/146, 382/151, 152, 199, 289, 294, 295; 355/43, 355/53, 72, 75; 356/399–401; 348/87
See application file for complete search history.

(56) References Cited

U.S. PATENT DOCUMENTS

| | | | | |
|---|---|---|---|---|
| 5,243,665 A | * | 9/1993 | Maney et al. | 382/152 |
| 5,657,394 A | * | 8/1997 | Schwartz et al. | 382/151 |
| 5,917,332 A | * | 6/1999 | Chen et al. | 324/750.02 |

(Continued)

OTHER PUBLICATIONS

Non-Final Rejection mailed Jan. 10, 2008 for U.S. Appl. No. 10/824,884.

(Continued)

*Primary Examiner* — Amir Alavi
(74) *Attorney, Agent, or Firm* — DASCENZO Intellectual Property Law, P.C.

(57) ABSTRACT

A method is provided for increasing the accuracy of the positioning of a first object relative to a second object. The method overcomes the disadvantageous influence of thermal drift between a first and a second object during a positioning of a first object on a second object. The method finds applications in manufacturing, for example, in the manufacturing of semiconductor components. The method utilizes recognition of structures on the second object which have a minimum structure width. At a first instant, using one recognition procedure, the first object is positioned on the second object in a desired position. The relative displacement of the two objects is determined at the first instant and on at least one subsequent instant. A second recognition procedure may be used for this purpose. The second recognition procedure may have a resolution accuracy which is different than the resolution accuracy of the first resolution procedure. The second recognition procedure may be a pattern recognition method. The relative displacement determined at the second instant is used to correct the positioning of the first and second objects as necessary to maintain a desired position of the two objects.

5 Claims, 2 Drawing Sheets

U.S. PATENT DOCUMENTS

| | | | |
|---|---|---|---|
| 6,205,240 B1 * | 3/2001 | Pietrzak et al. | 382/152 |
| 6,373,976 B1 * | 4/2002 | Pierrat et al. | 382/151 |
| 6,710,798 B1 * | 3/2004 | Hershel et al. | 348/87 |
| 6,819,789 B1 * | 11/2004 | Kantor et al. | 382/151 |
| 6,850,646 B1 * | 2/2005 | Silver et al. | 382/199 |
| 7,734,084 B2 * | 6/2010 | Stewart et al. | 382/151 |
| 2001/0014170 A1 | 8/2001 | Willems Van Dijk et al. | |
| 2004/0208355 A1 | 10/2004 | Schineidewind et al. | |
| 2008/0298671 A1 | 12/2008 | Schineidewind et al. | |
| 2010/0111403 A1 * | 5/2010 | Schineidewind et al. | 382/151 |

OTHER PUBLICATIONS

Non-Final Rejection mailed May 14, 2009 for U.S. Appl. No. 12/170,848.

* cited by examiner

METHOD FOR INCREASING THE ACCURACY OF THE POSITIONING OF A FIRST OBJECT RELATIVE TO A SECOND OBJECT

CROSS-REFERENCE TO RELATED APPLICATIONS

This application is a continuation of U.S. patent application Ser. No. 12/170,848, filed Jul. 10, 2008, now abandoned, which is a continuation of U.S. patent application Ser. No. 10/824,884, filed Apr. 15, 2004, now abandoned, which claims priority to German Application No. 10317778.7, filed Apr. 16, 2003, the contents of each of which are hereby incorporated herein by reference in their entirety.

BACKGROUND OF THE INVENTION

In many areas of technology it is necessary to position objects relative to one another with high precision. This requirement also exists in the field of semiconductor technology, for example, during the testing of semiconductor components, which may be fabricated on semiconductor wafers. A plurality of semiconductor components of identical configuration are generally situated on a semiconductor wafer. In this case, so-called probers are used for testing the semiconductor components. For this purpose, contact pads are arranged at different locations in the semiconductor components (at the same location for each semiconductor component on the semiconductor wafer). During the testing with the probers, contact is made with the contact pads by the tips of contact-making needles in the probers.

By means of such contact-making, an electrical contact with the semiconductor component is produced, on the one hand to apply specific signals to the semiconductor component and on the other hand to measure the reaction to said signals.

According to setting methods in the prior art, the positioning of contact-making needle tips of a prober (referred to as a first object) relative to contact pads on the semiconductor component (referred to as the second object) is performed under optical or visual control. In such methods, the semiconductor component is observed visually from above by means of a microscope and the prober needle tips are then positioned onto corresponding contact pads under visual observation. If the contact needles happen to be set or positioned such that they lie on the contact pads of the semiconductor component, the setting operation is ended.

In some probers, it is also possible to mount the contact needles with a corresponding setting on a so-called needle card. A specific needle card is used for each type of a semiconductor component. In such cases it is then necessary to bring a further semiconductor component to be tested below the set contact-making needles so that the contact-making needles again make contact with the contact pads. If this has been done, the next test operation can be performed.

The positioning of each semiconductor component below a structure of contact needles may be done manually under visual observation using manual probers commonly known in the prior art. Automatic probers also are known. In the case of automatic probers, it may be possible for each semiconductor component to be brought automatically below the structure of contact-making needles if the distances or orientation of the needles and the semiconductor component is known (e.g., a rotation angle $\phi$ are known). In this case, the displacement of the semiconductor wafer required in order to perform an exact positioning may be calculated.

The visual or optical observation required for placing the needle tips on the contact pads may be performed by means of automatic image recognition systems. In this case, a pattern recognition is performed on or by an image of an observed region of the semiconductor component. The image may be recorded by a video camera, a CCD linear array or matrix or other image recording devices at a first instant. On account of the surface structure of the semiconductor component, the latter has a pattern. This pattern is significant for the component. If a further identical component is now to be tested, the latter then exhibits the same pattern. From the positional difference between the two patterns, the pattern recognition system can then determine geometrical correction values required to allow the semiconductor component that is currently to be tested to be positioned precisely below the needle structure by means of a positioning device.

In the context of the increasing miniaturization of the structures on the semiconductor components, considerable requirements or demands are made for the proper positioning of the semiconductor component with respect to the tips of the contact-making needles. The small widths of the miniaturized structures may be of the order of the wavelength of the light making it difficult or impossible to visually or optically resolve them to a sufficient extent. Thus, complex AFM probers, which operate according to the principle of atomic force microscopy (AFM), may be used for making contact with semiconductor component structures down in the range of 100 nm width. In this case, a contact-making needle is moved at a small distance above the surface of the semiconductor component, in particular in the region in which the contact pad is situated. As a result of the movement, the topography image of the region of the semiconductor surface is scanned on account of an interaction force occurring between the contact needle and the semiconductor surface. The exact position of the contact pad is may thus determined without the need for a visual observation.

The contact-making needle is referred to as a cantilever in the case of AFM probers. A piezo-drive is available for moving the cantilever, by means of which the cantilever executes a scan movement in order to obtain an image of the surface situated underneath, a scan. When the AFM prober is used, at a first instant, the region where contact is subsequently made is scanned by means of the cantilever. Once the scan is present, the tip of the cantilever is brought to the desired position determined and brought into contact at a second instant.

What is problematic in this case is that the semiconductor wafer and cantilever are exposed to thermal influences. This leads to a thermal drift in the time period between the first and second instants, i.e., expressed generally, a relative displacement arises between the first and second objects. In particular, this phenomenon occurs during the testing of semiconductor components under thermally controlled conditions. A so-called thermo-chuck is used in this case, which, on the one hand, fixedly clamps the semiconductor wafer during the test operation and, on the other hand, sets a desired temperature in a higher or lower temperature range in comparison with room temperature. The temperature alteration of the semiconductor wafer, for example on account of the thermal radiation, also influences the drive of the cantilever, as a result of which the drift occurs, which can no longer be disregarded in particular in the case of the small structure widths since, when making contact, the drift means that the cantilever no longer meets the position which was previously determined during the scan operation.

As is rapidly apparent, even thermostatic regulation of the surroundings cannot provide a remedy here since the drift is generated by the method itself. This problem area may also occur in other fields of application, in particular in the field of semiconductor technology, for example during bonding operations. Therefore, as a general proposition, a thermal drift or other drift between two objects can be problematic.

An object of the present invention is to prevent the disadvantageous influence of a thermal drift or other drift between a first and a second object during a positioning of a first object on a second object.

SUMMARY OF THE INVENTION

In accordance with the principles of the invention, a method for increasing the accuracy of the positioning of a first object relative to a second object is provided. The method may find particular applications in the production or manufacturing of semiconductor components. The method utilizes a recognition of structures on the second object, which have a minimum structure width, for positioning the first object. In the method at a first instant, the position of the first object relative to a second object is determined by use of a first recognition method or procedure which has a resolution accuracy which is higher than the minimum structure width. The first object is then at a second instant positioned at a desired position on the second object. Either the first or the second object, or both, may be movable by means of a positioning device. Images of an observation region that encompasses at least the first object and the desired position are acquired during the method.

BRIEF DESCRIPTION OF THE DRAWINGS

Further features of the invention, its nature, and various advantages will be more apparent from the following detailed description and the accompanying drawings, wherein like reference characters represent like elements throughout, and in which.

Figure 1:
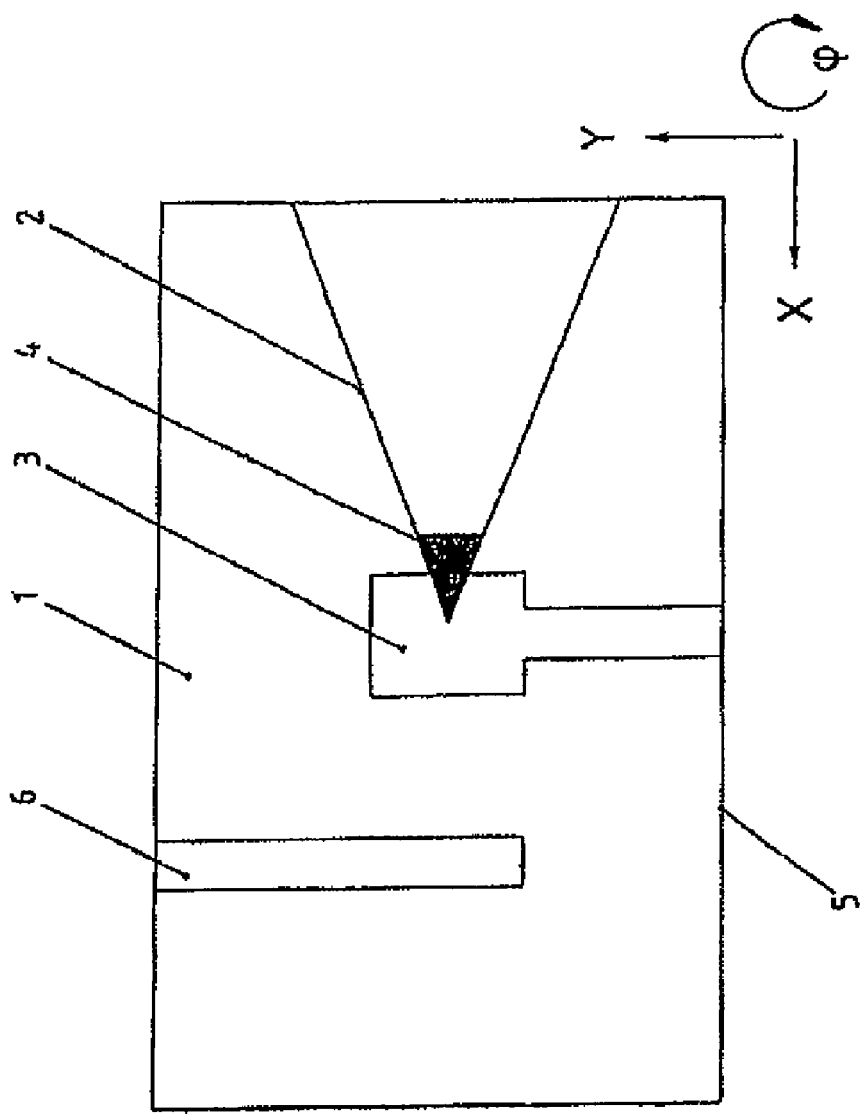
FIG. 1 is a schematic representation of an image of an observation region at a first instant in the process of placing a first object on a second object, in accordance with the principles of the present invention.
Figure 2:
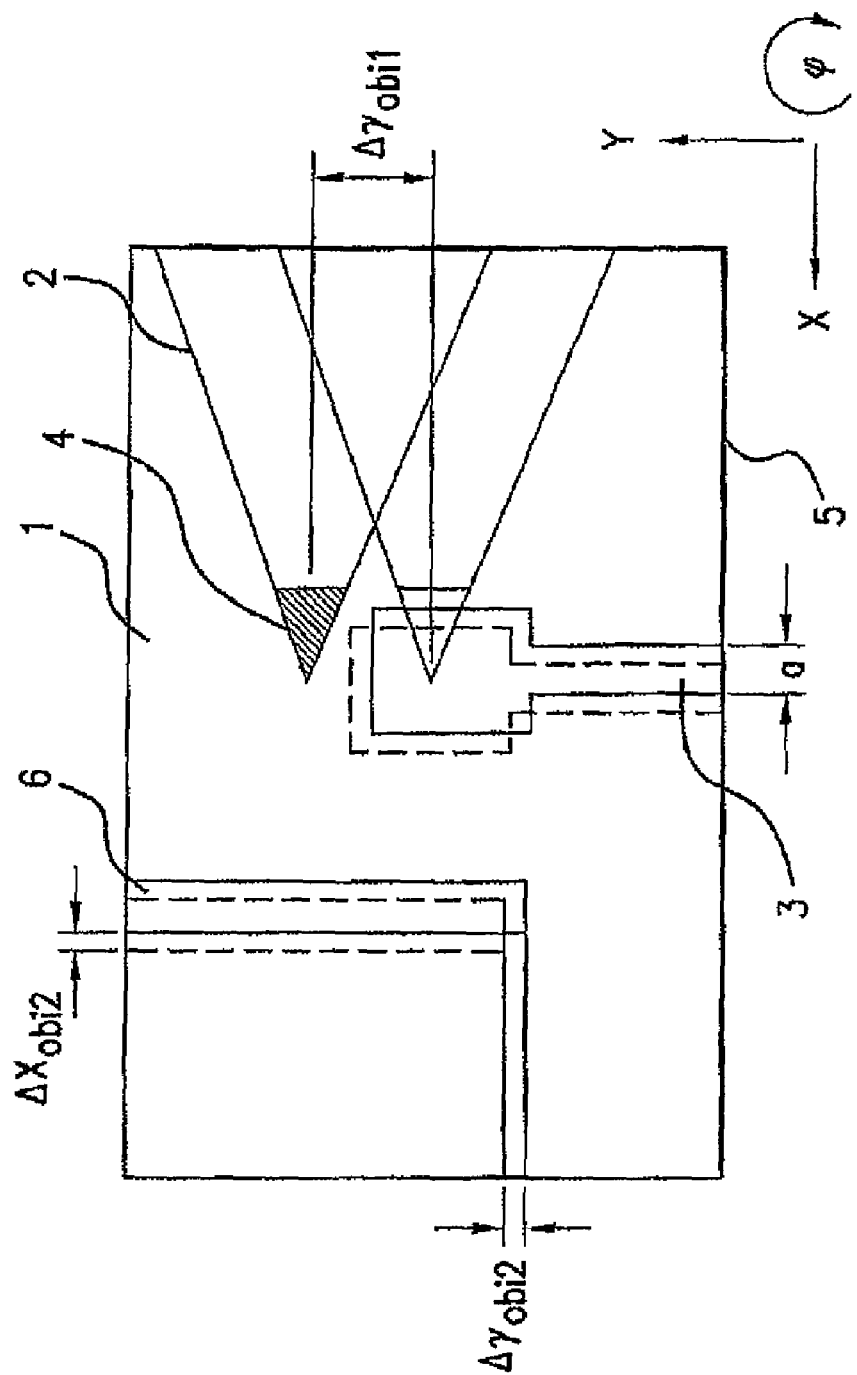
FIG. 2 is a schematic representation of an image of an observation region at a second instant in the process of placing a first object on a second object, in accordance with the principles of the present invention.

The following is a list of reference symbols used in the FIGS. 1 and 2:

LIST OF REFERENCE SYMBOLS

1 Semiconductor component
2 Cantilever
3 Contact pad
4 Tip of the cantilever
5 Observation region
6 Structural element

DETAILED DESCRIPTION OF THE INVENTION

The present invention provides a method for overcoming the influence of a thermal drift or other drift between a first and a second object during a positioning of a first object on a second object.

The inventive method overcomes the influence of thermal or other drift between the two objects by virtue of the fact that in the method, before or at a second instant, by means of a second recognition method, a relative displacement of the first object with respect to the second object is determined with regard to a first instant, but at least with respect to the temporal proximity thereof, and the position of the second object is corrected during the positioning on the second object by means of correction values which correspond to the relative displacement determined.

This method eliminates any temperature drift which may occur between the first instant and the second instant by ascertaining and correcting for the relative displacement of the two objects between the first and second instants.

A favorable embodiment of the method provides for a pattern recognition method to be used as the second recognition method. Pattern recognition methods record images of the observation region and acquire patterns contained in said images. By comparing two identical patterns which are displaced or rotated relative to one another in the imaging, it is possible to determine the coordinate differences of each pixel of the two patterns. Computer-aided calculation of the positional displacement of the two patterns with respect to one another is thus possible. According to the invention, a pattern recognition method may now be superimposed on the controlled positioning of the first object on the second object, thereby enabling the positional correction.

Since the pattern recognition methods recognize patterns which need not necessarily represent sharp images, it is possible that the resolution accuracy of the pattern recognition method is lower (i.e. less fine) than the minimum structure width. As a result, the method according to the invention can be realized very simply and cost-effectively.

Although it is possible, in principle, to carry out the second recognition method with a resolution accuracy which corresponds to or is even greater (i.e., finer) than the minimum structure width, it is also possible to use a method which makes has less stringent requirements of the resolution accuracy. By way of example, it is possible to use scanning electron microscopes for the second recognition method in the cases of small structure widths in semiconductor technology that lie in the wavelength range of the light. These scanning electron microscopes would then sharply image the observation region. However, this sharp imaging would represent a pattern for a pattern recognition system in exactly the same way as the image of an optical microscope which would inevitably be unsharp on account of the proximity to the wavelength of the light. However, since the unsharpness does not adversely influence the characteristic of a pattern (in contrast to an image), the pattern recognition method can thus operate in the light range, i.e.—in this example—with a lower resolution accuracy than the minimum structure width.

A particularly preferred embodiment of the method according the invention may feature one or more of the following steps:

a step wherein the positioning device is brought into a basic position $x_o$, $y_o$, $\phi_o$, at the first instant $T_o$;

a step wherein in temporal proximity to the first instant $T_o$, while the positioning device is situated in the basic position $x_o$, $y_o$, $\phi_o$, the pattern recognition method is used to acquire a first image pattern from the observation region, which encompasses at least the second object;

a step wherein in temporal proximity to the first instant $T_o$, while the positioning device is situated in the basic position $x_o$, $y_o$, $\phi_o$, the pattern recognition method is used to acquire a second image pattern from the observation region, which encompasses at least the first object;

a step wherein the positioning apparatus is brought into the basic position $x_o$, $y_o$, $\phi_o$ before the second instant, the pattern recognition method is used to acquire a third image pattern from the observation region, which encompasses at least the second object, and the pattern recognition method is used to acquire a fourth image pattern from the observation region, which encompasses at least the first object, step wherein, by means of the pattern recognition method, a first pattern displacement of the first object is determined from the first and third image patterns and a second pattern displacement is determined from the second and fourth image patterns and the relative displacement is calculated from the first and second pattern displacements; and a step wherein the relative displacement calculated is used to correct the desired position $x_1$, $y_1$, $\phi_1$ of the positioning device at the second instant.

The drift both of the first and of the second object with regard to the basic position of the positioning device is determined by means of this embodiment. The displacements of both objects are thus concomitantly included or determined. From the difference between the respective two image patterns of the two objects it is possible to determine the displacement of the image patterns of the respective object and thus that of the object itself. The relative displacement of the two objects with respect to one another is then calculated from the displacements of the two objects, which becomes possible since the displacements of the two objects relate to a common basis, namely that of the basic position.

In an expedient manner, in a pattern recognition method, only in each case a common image pattern of the first and the second object is recorded only in the basic position and in the desired position of the positioning device. Since the pattern of the first object can be assumed to be known, the first pattern (or the second pattern if the configuration thereof is known) can then already be established from the common image pattern by means of the pattern recognition method. In this case, in one development of the method, the first image pattern is identical to the second image pattern and/or the third image pattern is identical to the fourth image pattern.

In a further variant of the method according to the invention, it is provided that, after the second object, the relative displacements of further objects are determined in an identical manner, from which, during the positioning of the further objects on the first object, correction values for correcting their desired positions are likewise determined. By way of example, if a plurality of contact needles or cantilevers are used for testing semiconductor components, it thus becomes possible to correct all the drifts of all these objects.

In order to ensure that the first objects also actually remain in the object desired position even if a drift occurs during the further progression after the positioning of the first object on the second object, it is provided that, after the second instant, the determination of the relative displacement with regard to the temporal proximity of the first instant is repeated and the position of the positioned first object on the second object is tracked such that the object desired position of the first object on the second object is complied with.

The invention will now be explained in more detail below on the basis of an exemplary embodiment with reference to FIGS. 1 and 2 which show images of an observation region at a first and second instant, respectively. The exemplary embodiment relates to the testing of semiconductor components 1 by means of a cantilever 2. Electrically conductive connections (not specifically shown) are connected to the cantilever 2 and serve for applying test signals to the cantilever 2 and for recording and forwarding reaction signals.

The cantilever is also connected to a positioning device (not specifically shown). This positioning device is driven by a piezo-crystal which may execute only very small movements as seen macroscopically but, as seen microscopically, whose movements can cover the entire observation region. These movements can be executed very rapidly by means of the piezo-crystal, so that the cantilever 2 can be scanned over the surface of the semiconductor component 1. The surface may thus be sensed by means of the principle of atomic force microscopy. Consequently, the position of a contact pad 3 onto which the tip 4 of the cantilever 2 can be positioned is also detected.

In the first position illustrated in FIG. 1, the sensing of the surface of the semiconductor component 1 has already been concluded. The tip 4 thus "knows" its desired position on the contact pad 3.

The surface of the semiconductor component 1 is observed by means of a CCD camera over the observation region 5. The image of the observation region shown in FIG. 1 and FIG. 2 is only figurative—since the minimum structure width is ~100 nm and the observation region is therefore imaged in an unsharp or diffuse manner.

The image recorded by the CCD camera is processed further in the further process, as is demonstrated below. The image may also be displayed by means of a monitor for observing the operation.

Shortly before the scanning of the surface, the semiconductor wafer on which the semiconductor component 1 is situated (the semiconductor component being shown only partially in FIG. 1 and FIG. 2) may have been placed onto a thermo-chuck in order to carry out the testing under elevated temperatures. The semiconductor wafer is thus heated. The heating process still persists at the first instant illustrated in FIG. 1.

The heating process may give rise to a thermal drift, which becomes visible in FIG. 2. FIG. 2 illustrates the observation region at the second instant. Dashed lines are used therein to illustrate the position of the cantilever 2, of the contact pad 3 and of further structural elements 6 from FIG. 1. It thus becomes possible to see the drift between the first and second instants in the form of a displacement $\Delta y_{obj2}$, $\Delta x_{obj2}$ of the contact pad 3 and of the structural elements 6 in the x and y directions and a displacement $\Delta y_{obj1}$ of the cantilever 2 in the y direction. The cantilever 2 has not experienced a drift in the x direction and neither the cantilever 2 nor the semiconductor component 1 has experienced an angular displacement by the rotation angle $\phi$.

The exemplary embodiment is shown or described with only one cantilever 2. In practice, however, a plurality of cantilevers may be used, the method described below being employed correspondingly.

Directly after the scan described above, shortly after the first instant $T_o$, the basic position $x_o$, $y_o$, $\phi_o$ is adopted by means of the positioning device. An image pattern is taken there and is compared with the image pattern in the basic position $x_o$, $y_o$, $\phi_o$ at the second instant $T_1$. The pattern comparison is used to calculate the relative displacement between the semiconductor component 1 and the cantilever 2 from the displacements $\Delta y'_{obj2}$, $\Delta x'_{obj1}$ and $\Delta y'_{obj1}$ of the image patterns, which correspond to the real displacements $\Delta y_{obj2}$, $\Delta x_{obj2}$ and $\Delta y_{obj1}$ of the two objects. In the case of a setting of the desired position $x_1$, $y_1$, $\phi_1$ for achieving an object desired position in which the cantilever 2 lies above the contact pad 3, the desired position $x_1$, $y_1$, $\phi_1$ is calculated correctively using the relative displacement.

Usually, in each case only one image pattern of the first and second instants are used for determining the displacements $\Delta' y_{obj2}$, $\Delta x'_{obj1}$ and $\Delta y'_{obj1}$ of the image patterns. In this case, it is necessary for the system to be taught the structure of the cantilever and the image pattern of the semiconductor component 1.

The methods for the one cantilever case and the multiple cantilever case may be subdivided into a number of steps or substeps from a mathematical view point.

The following steps may be carried out for one cantilever:
1. Learning of the cantilever models (as standard models, only necessary in the case of a new type of cantilever or in the case of another enlargement),
2. Calibration of the pattern recognition system with respect to the positioning drive of the respective cantilever 2 (only in the case of new installation or change in the enlargement),
3. Movement to the observation region 5,
4. Movement of the cantilever 2 out of the observation region 5,
5. Automatic learning of the structure of the semiconductor component 1,
6. Scanning and movement into basic position,
7. Acquisition of the structure and cantilever coordinates,
8. Readjustment of the cantilever positions relative to the structure coordinates with the aid of the positioning device,
9. Renewed acquisition of the structure and cantilever coordinates and possible post-correction (successive approximation),
10. Movement into object desired position.

The following steps may be carried out for a case with a plurality of cantilevers:
1. Learning of the cantilever models (as standard models, only necessary in the case of a new type of cantilever or in the case of another enlargement),
2. Calibration of the pattern recognition system with respect to the positioning drive of the respective cantilever 2 (only in the case of new installation or change in the enlargement),
3. Movement to and learning of a specific test structure,
4. Constant movement of all the cantilever tips 4 on the test structure and acquisition of the structure and cantilever coordinates,
5. Scanning with a cantilever,
6. Movement into basic position of the respective contact position (the contact position which corresponds to a cantilever) and acquisition of the test structure and cantilever coordinates,
7. Movement to the observation region 5,
8. Movement of the cantilever 2 out of the observation region 5,
9. Automatic learning of the structure of the semiconductor component 1,
10. Scanning and movement into basic position,
11. Acquisition of the structure and cantilever coordinates,
12. Readjustment of the cantilever positions relative to the structure coordinates with the aid of the positioning device,
13. Renewed acquisition of the structure and cantilever coordinates and possible post-correction (successive approximation),
14. Movement into object desired position.

It will be understood that the foregoing is only illustrative of the principles of the invention, and that various modifications can be made by those skilled in the art without departing from the scope and spirit of the invention. For example, the invention may be readily used in wireless data communication systems using any of the variety of available or evolving wireless data communication protocols.

We claim:

1. A method for increasing the accuracy of the positioning of a first object relative to a second object by utilizing a recognition of structures on the second object that have a minimum structure width, the method comprising using a processor to perform the following steps:

(1) acquiring images of an observation region that encompasses at least the first object and a desired position on the second object;

(2) at a first instant $T_0$, by means of a first recognition method having a resolution accuracy that is higher or better than the minimum structure width, determining the position of the first object relative to a second object; and (3) repositioning the first object relative to the second object to the desired position at a second instant, wherein at least one of the first and the second objects are movable using a positioning device, wherein before the second instant, by means of a second recognition method, a relative displacement of the first object with respect to the second object is determined with respect to their positions at the first instant, wherein step (3) further comprises correcting for the relative displacement of the first object with respect to the second object, wherein a pattern recognition method is used as the second recognition method, and further wherein bringing a positioning device to a basic position $x_0, y_0, \phi_0$ at about the first instant $T_0$, and further in temporal proximity to the first instant $T_0$ using the pattern recognition method to acquire a first image pattern from the observation region that encompasses at least a portion of the second object and a second image pattern from the observation region that encompasses at least a portion of the first object;

bringing the positioning device to a basic position $x_0, y_0, \phi_0$ before or at the second instant, and further using the pattern recognition method to acquire a third image pattern from the observation region that encompasses at least a portion of the second object, and a fourth image pattern from the observation region that encompasses at least a portion of the first object;

by means of the pattern recognition method, determining a first pattern displacement from the first and third image patterns and a second pattern displacement from the second and fourth image patterns and further determining the relative displacement from the first and second pattern displacements; and using the relative displacement to correct the position $x_0, y_0, \phi_0$ of the positioning device to a desired position at the second instant.

2. The method of claim 1 wherein the resolution accuracy of the pattern recognition method is lower or poorer than about the minimum structure width.

3. The method of claim 1 wherein at least one of the first image pattern and the third image pattern is respectively identical to the second image pattern and the fourth image pattern.

4. The method of claim 1 further comprising, after the second object is processed, determining the relative displacements of the first object and further objects that have minimum structure widths using steps that are identical to steps (1)-(3) to correct the relative positions of the further objects and the first object.

5. The method of claim 1 further comprising,
after the second instant, repeating in time the determination of the relative displacement of the first and second objects so as to maintain a desired position of the first object on the second object.

* * * * *